July 8, 1930.  C. F. DOUGHERTY  1,770,101
GAME
Filed June 5, 1929  2 Sheets-Sheet 2
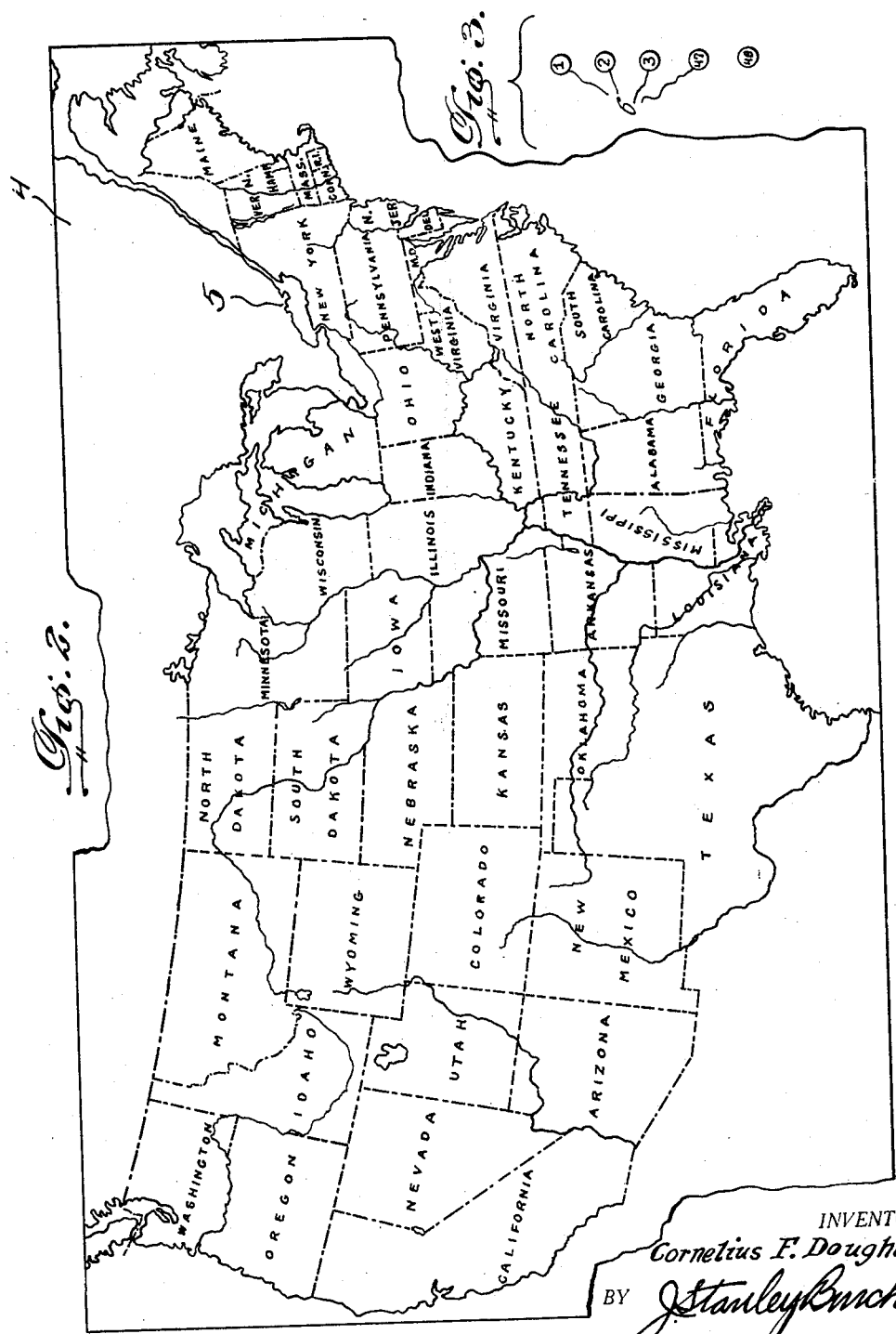

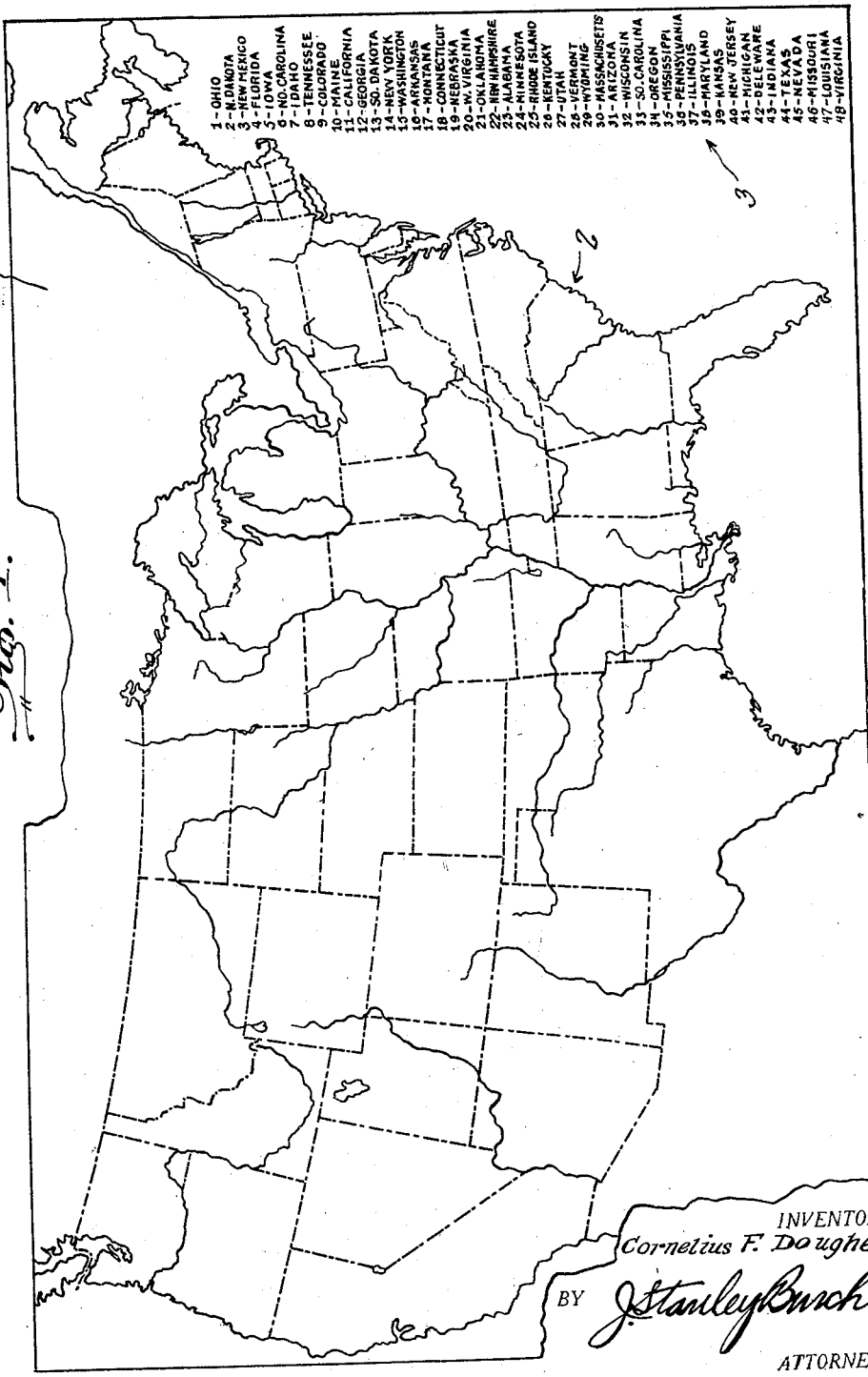

Patented July 8, 1930

1,770,101

UNITED STATES PATENT OFFICE

CORNELIUS F. DOUGHERTY, OF SACRAMENTO, CALIFORNIA

GAME

Application filed June 5, 1929. Serial No. 368,499.

The present invention relates to improvements in games and has for its principal object to provide a game that will be educational as well as afford amusement to the players.

More particularly, the game is intended to test the memory and knowledge of the players with respect to their geographical education.

Another important object of the invention is to provide a game of the above-mentioned character wherein a blank map of the United States is employed, there being also provided forty-eight game pieces each of which is numbered on one face, the object being for each player to properly position the selected game piece in its corresponding location on the blank map.

A further object is to provide a game of the above-mentioned character which is simple in construction, inexpensive, strong and durable and further well adapted for the purposes for which it is designed.

Other objects and advantages of the invention will become apparent from the following description when taken in connection with the accompanying drawings.

In the accompanying drawings wherein like reference characters indicate corresponding parts throughout the same;

Figure 1 is a fragmentary plan view of the blank map of the United States showing the numbers given the various States.

Figure 2 is a similar view of a reference map of the United States wherein each State is properly identified; and Figure 3 is a detail top plan of a few of the game pieces used in conjunction with the playing of the game.

In the drawings wherein for the purpose of illustration is shown the preferred embodiment of my invention, the numeral 1 designates a base that may be constructed of cardboard, or any other suitable material and printed or otherwise arranged on the upper face of the base is a blank map of the United States, there being only disclosed on the face of the map, the boundary lines of the various States. It will be observed upon referring to Figure 1 that none of the States are identified by names.

Each of the several States is however given a particular number and the names of the States and their respective numbers are printed on the face of the base at one side of the map 2. This identifying indicia is indicated generally at 3.

In Figure 2, a similar base member 4 is shown with the map of the United States arranged on the upper face thereof. This map 5 differs only from the map 2 in that the names of the several States are printed in their respective places and this map may be termed a reference or guide map to be used in the playing of the game as will be presently described.

The game further includes the provision of relatively small circular discs 6 which constitute the game pieces and which discs may be constructed of any suitable material. There are forty-eight of such discs provided and these discs are numbered from 1 to 48 consecutively and the numbers appear only or one face of the discs.

In playing the game, the map shown in Figure 1 is placed on the table and the players are seated around the table. The reference map shown in Figure 2 is temporarily placed out of view and the forty-eight game pieces are placed in the center of the table and are mixed together with the numbered faces being presented downwardly so that the numbers are not visible and only the blank faces of the game pieces are presented to view. Play is then started and the first player starts drawing from the pile. The particular game piece selected is then compared with the respective number appearing on the base 1 and then after referring to the identifying printed matter designating the particular State given the number that has been selected by the player. Said player then attempts to place the game piece where in his opinion that particular space selected and corresponding to the number on the game piece picked up by the player is located on the map 2.

In a similar manner, the other players successively attempt to place the game pieces selected by them in their proper positions on the map 2 and after all of the game pieces have been placed on the map 2, reference is then made to the guide map 5 to ascertain whether or not the players have properly placed the game pieces selected by them in the proper positions on the map 2 to designate the particular States and their location with respect to one another.

Any suitable scoring means may be provided in conjunction with the playing of the present game whereupon a player will be given a certain number of points for properly placing the game piece selected by him in its proper position on the map 2 and obviously a certain number of points are to be taken away from the player when the game piece is improperly placed by him on the map 2.

While I have mentioned the game as being particularly adapted to be played in studying the map of the United States, maps of other countries may be equally as well employed and in addition, each State may be divided up into the various sub-divisions representing the different counties of the State.

A game of this character will tend to promote the study of geography by school children and in addition will afford amusement and pleasant pastime for older persons.

As heretofore constructed, dissected maps have been cut out on irregular or boundary lines so that the solving of the game is assisted by the shape of the pieces or sections and the shape of the openings from which the pieces are taken. However, a game of the type shown in the present invention employs game pieces that are all of the same shape and size hence it is not necessary to depend on any particular shape or boundary line to assemble the respective game pieces in the playing of the game.

While I have shown the preferred embodiment of my invention, it is to be understood that minor changes in the size, shape and arrangement of parts may be resorted to without departing from the spirit of the invention or the scope of the appended claims.

What I claim is:

1. In a game, a blank map divided into a plurality of sub-divisions, said map being provided with indicating indicia for each sub-division, the indicating indicia not being located on the respective sub-divisions, and a plurality of game pieces havng indicating indicia thereon corresponding to the indicating indicia for the respective subdivisions as and for the purpose described.

2. In a game of the class described, a map divided into a plurality of independent blank sub-divisions, said map being provided with indicating indicia for the respective sub-divisions that do not appear on the respective sub-divisions, the map being provided with numbers for the indicating indicia of the several sub-divisions, and game pieces, each having a predetermined number to correspond with the aforementioned numbers as and for the purpose described.

3. In a game, a map having a series of independent sub-divisions arranged thereon in a predetermined manner, said sub-divisions being blank, said map being provided with a name and number for each sub-division, a plurality of game pieces corresponding in number to the sub-divisions of the map, each game piece having a particular number arranged on one face thereof adapted to correspond with the complementary number associated with the names of the sub-divisions as and for the purpose described.

In testimony whereof I affix my signature.

CORNELIUS F. DOUGHERTY.